US008757477B2

(12) United States Patent
Do

(10) Patent No.: US 8,757,477 B2
(45) Date of Patent: Jun. 24, 2014

(54) IDENTIFIER GENERATION FOR VISUAL BEACON

(75) Inventor: Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/219,350

(22) Filed: Aug. 26, 2011

(65) Prior Publication Data

US 2013/0048707 A1    Feb. 28, 2013

(51) Int. Cl.
*G06F 17/00* (2006.01)

(52) U.S. Cl.
USPC .......................................................... 235/375

(58) Field of Classification Search
USPC ................. 235/375; 455/414.2, 456.1, 456.3, 455/414.1–414.3
See application file for complete search history.

(56) References Cited

U.S. PATENT DOCUMENTS

| | | | |
|---|---|---|---|
| 7,321,305 B2 * | 1/2008 | Gollu | 340/572.1 |
| 2003/0155413 A1 | 8/2003 | Kovesdi et al. | |
| 2008/0011841 A1 * | 1/2008 | Self et al. | 235/385 |
| 2008/0137912 A1 | 6/2008 | Kim et al. | |
| 2008/0200153 A1 * | 8/2008 | Fitzpatrick et al. | 455/414.1 |
| 2009/0163228 A1 | 6/2009 | Blumberg et al. | |
| 2011/0039573 A1 | 2/2011 | Hardie | |
| 2011/0079639 A1 * | 4/2011 | Khan | 235/375 |
| 2011/0178708 A1 | 7/2011 | Zhang et al. | |
| 2011/0228322 A1 | 9/2011 | Ashikawa et al. | |
| 2012/0142322 A1 * | 6/2012 | Gomez | 455/414.3 |

FOREIGN PATENT DOCUMENTS

| | | |
|---|---|---|
| JP | 2006084226 A | 3/2006 |
| WO | 2006065563 A2 | 6/2006 |
| WO | 2009098319 A2 | 8/2009 |
| WO | 2011020048 | 2/2011 |

OTHER PUBLICATIONS

Lai, Y. C. et al, "A GPS navigation system with QR code decoding and friend positioning in smart phones", 2010 2nd International Conference on Education Technology and Computer (ICETC), pp. V5-66-V5-70, (Jun. 2010).
Partial International Search Report—PCT/US2012/050784—ISA/EPO—Dec. 6, 2012.
Serra A.,et al., "Inertial Navigation Systems for User-Centric Indoor Applications". Internet Citation. Jan. 1, 2010. pp. 1-5. XP-002663219. Retrieved from the Internet: URL:http://geoweb.crs4.it/lib/exe/fetch.php?id=indoornavigation&cache=cache&media=nem2010-paper675 camera ready.pdf [retrieved on Nov. 10, 2011].
International Search Report and Written Opinion—PCT/US2012/050784—ISA/EPO—Jun. 24, 2013.

* cited by examiner

*Primary Examiner* — Steven Paik
*Assistant Examiner* — Toan Ly
(74) *Attorney, Agent, or Firm* — Silicon Valley Patent Group LLP

(57) ABSTRACT

A visual beacon, such as a Quick Response (QR) code or other type of artificial visual beacon is identified based on a coarse position and content information, and optionally, the type of the visual beacon. For example, position may be based on latitude and longitude, e.g., from a satellite positioning system, or the CellID from a cellular network. The content information may be based on a sampling of the content before or after decoding. The content information may alternatively be all of the decoded content or an image of the visual beacon. Thus, for example, a mobile platform may generate a visual beacon identifier using the position and content information, which is transmitted to a navigation assistance server. The server can access and transmit to the mobile platform a navigation assistance message associated with the visual beacon identifier. If no visual beacon identifier is found, the server may enter the information.

22 Claims, 8 Drawing Sheets

| VBID | Length | Description |
|---|---|---|
| Coarse position | 6 bytes | Coarse VB coordinate in latitude, longitude, and altitude (LLA) or position information. Latitude and longitude in 1~0.1 degree resolution. Altitude may be omitted. |
| VB Type | 2 bytes | Visual beacon type<br>0 ............. QR code<br>1 ............. 1D bar code<br>2 ............. Data matrix<br>3 ............. PDF 417<br>4 ............. Reserved for other codes.<br>QR version (1 to 40) |
| contentID | 8 bytes | Identifier based on VB contents |
| Fine position (optional) | 3 bytes | Fine VB coordinate in latitude, longitude, altitude. Latitude in 0.1~0.01 degree resolution. Longitude in 0.1~0.01 degree resolution. Altitude is in 10~100 m resolution but may be omitted. Fine LLA is expressed as offset from the coarse LLA. Final coordinate = fine LLA + coarse LLA. |
| VB contents (optional) | Variable | Entire VB contents (or image of VB) |

Fig. 3

| VBID | Length | Description |
|---|---|---|
| CellType | 1 byte | Cellular network type<br>0 ............. CDMA<br>1 ............. GSM<br>2 ............. WCDMA<br>All other values are reserverd |
| CellID | 8 bytes | MCC/MNC/LAC/CI for GSM, MCC/MNC/RNC-ID/CI for WCDMA, or SID/NID/BaseID/PN sequence number for CDMA |
Fig. 4
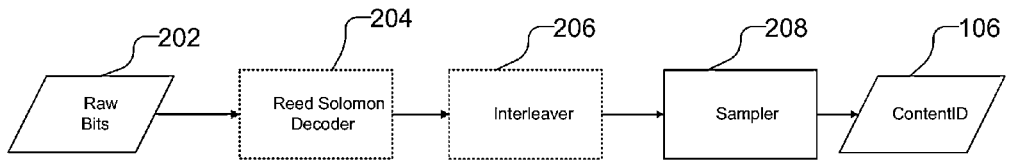
Fig. 5
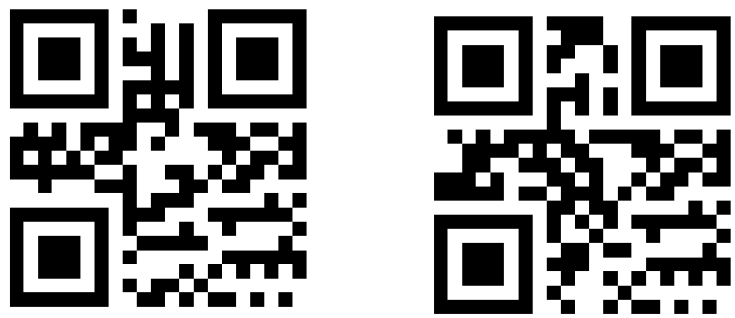
Fig. 6A         Fig. 6B

IDENTIFIER GENERATION FOR VISUAL BEACON

BACKGROUND

The use of accurate position information of a mobile platform, such as cellular or other wireless communication devices, is becoming prevalent in the communications industry. The satellite positioning system (SPS), such as the Global Positioning System, offers an approach to providing wireless mobile platform position determination. A SPS user can derive precise navigation information including three-dimensional position, velocity and time of day through information gained from satellite vehicles (SVs) in orbit around the earth. The signals that are received from the SVs are typically weak. Therefore, in order to determine the position of a mobile platform, the SPS receiver must be sufficiently sensitive to receive these weak signals and interpret the information represented by them.

One limitation of current SPS receivers is that their operation is limited to situations in which multiple satellites are clearly in view, without obstructions, and where a good quality antenna is properly positioned to receive such signals. As such, they normally are unusable in areas with blockage conditions, such as where there is significant foliage or buildings or other obstacles (e.g., urban canyons) and within buildings.

Visual beacons (VB), such as Quick Response (QR) codes or similar, or 1D or 2D bar codes, are becoming prevalent and are increasingly available in various forms—printed as a coupon, put on merchandise, or mounted on physical structures, such as walls or windows. Accordingly, VBs, such as QR codes, that are affixed to physical structures may be used to assist in positioning as the VB is stationary and can be associated to a specific location, which may be particularly advantageous when indoors or in environments where other positioning methods are less effective. However, there is presently no method of uniquely identifying QR codes or other VBs, which may result in ambiguity in position determination based on VBs. Thus, a mechanism for unique identifier generation for QR codes is desirable to assist in the use of QR codes for positioning.

SUMMARY

A visual beacon, such as a Quick Response (QR) code or other type of artificial visual beacon is identified based on a coarse position, the type of visual beacon and content information. For example, position may be based on latitude and longitude, e.g., from a satellite positioning system, or the CellID from a cellular network. The content information may be based on a sampling of the content before or after decoding. The content information may alternatively be all of the decoded content or an image of the visual beacon. Thus, for example, a mobile platform may generate a visual beacon identifier using the position and content information and optionally the type of visual beacon, which is transmitted to a navigation assistance server. The server can access and transmit to the mobile platform a navigation assistance message associated with the visual beacon identifier. The navigation assistance message may include information useful for positioning, for example exact coordinates of the visual beacon or information identifying other available ranging sources in the vicinity. The mobile platform may determine a position of the visual beacon with greater accuracy using the information in the navigation assistance message. If no record of the visual beacon identifier is found by the server, however, the server may enter the information after verification.

BRIEF DESCRIPTION OF THE DRAWING

FIG. 3 illustrates an example of the structure for a visual beacon identifier.

FIG. 4 illustrates visual beacon identifier entries.

FIG. 5 illustrates an example of generating content information for a visual beacon.

FIGS. 6A and 6B illustrate two examples of QR codes with similar contents.

DETAILED DESCRIPTION

Figure 1:
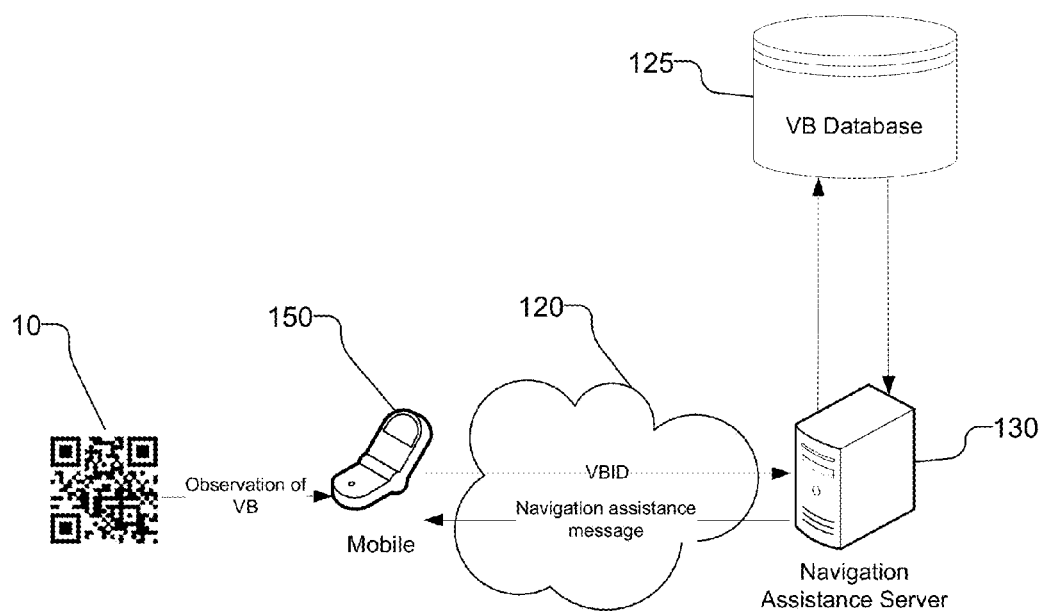
FIG. 1 illustrates a block diagram showing a system in which a mobile platform acquires navigation assistance information based on a visual beacon.

FIG. 1 illustrates a block diagram showing a system in which a mobile platform 150 acquires navigation assistance information based on a visual beacon (VB) 10, which is illustrated in the form of a QR code. The acquired navigation assistance information may include the location of the VB 10, and therefore the mobile platform 150, with respect to a local or global coordinate system, such as the WGS84 coordinate system. The navigation assistance information may instead or additionally include information with respect to neighboring visual beacons, wireless positioning resources or nearby ranging sources, user context, environmental context, and/or any other information that is desired to be associated with the VB.

As illustrated in FIG. 1, the mobile platform 150 observes the VB 10, e.g., by imaging the VB 10. Navigation assistance information associated with the VB 10 is stored in a visual beacon database VB database 125. The mobile platform 150 accesses the VB database 125 by generating a visual beacon identifier (VBID) which is provided to a navigation assistance server 130 via a wireless network 120. The generated VBID is used as an index to a database entry for the VB 10, which is associated with a navigation assistance message (or other desired information). The navigation assistance message may include information useful for accurate positioning of the mobile platform 150, such as the exact coordinate of the observed VB 10 or other available ranging sources in the vicinity of the VB 10. The navigation assistance server 130, thus, retrieves the navigation assistance message using the VBID provided by the mobile platform 150 and returns the navigation assistance message to the mobile platform 150 via the wireless network 120.

Figure 2:
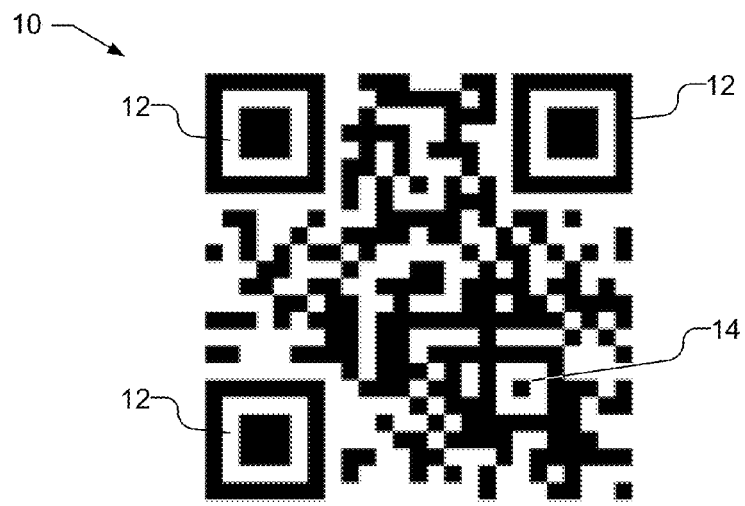
FIG. 2 by way of example illustrates a visual beacon in the form of a QR code.

The VB 10 may be any visual beacon, including an artificial or natural beacon, that is attached to a location that is accessible to the mobile platform 150, such as at an entrance or directory sign to a building, or other accessible location. In general, an artificial beacon refers to a visual object constructed with capability of data encoding and includes 1D, 2D, or 3D matrix codes, typically in a printed format. The VB 10 is illustrated in FIG. 1 as an artificial visual beacon in the form of a QR code, which is a matrix code created by Japanese corporation Denso-Wave. Other types of bar codes, matrix codes, or machine readable representations of data, including one dimensional bar codes or optical data matrix style codes, such as Data Matrix code, Semacode, Maxicode, or Aztec Code may be used if desired. These artificial visual beacons are first detected based on their known structural characteristics (e.g. finder patterns in QR code) and then decoded. FIG. 2 by way of example illustrates a VB 10 in the form of a QR code, which includes recognizable patterns, e.g., large squares 12 in three corners and one or more small squares 14 that can be used to determine position and alignment. These patterns in the QR code are used to detect the QR code and for QR based relative positioning, i.e., determining the position and orientation (pose) of the QR reader (which may be a camera on a mobile platform and therefore is sometimes referred to herein simply as a mobile platform) with respect to the QR code. The QR code additionally includes encoded data in the form of black and white squares, which is the encoded content of the QR code. The data encoded in the QR code may include any desired information, such as a URL, merchandise information, building information, and/or any other information. The QR code does not inherently include location information, i.e., information indicating the location of the QR code in a local or global context. Thus, a mobile platform can determine its pose with respect to the QR code, but without knowledge of the location of the QR code, the mobile platform is not able to determine its location in a local or global context.

Alternatively, the VB 10 may be a "natural" beacon, which includes all other visible objects excluding artificial beacons. These natural beacons are processed through SIFT or other image processing methods for feature descriptor extraction, and the extracted features can be used as identifying information of a natural beacon. Natural visual beacons may include objects such as doors, buildings, architectural details, sculptures, or other features.

Whether the visual beacon is an artificial beacon or a natural beacon, a unique identifier is generated for the VB 10, which can be used to unambiguously identify the VB. The description of the VB identifier (VBID), herein, uses artificial beacons and specifically QR codes as a primary example; however, other types of artificial beacons as well as natural beacons may be identified using the VBID. The VBID is generated based on specific information for each individual visual beacon, including the decoded or encoded contents of the VB, as well as the approximate location of the VB, in order to provide uniqueness in either a local or global context. Any mobile platform 150 should be able to generate the same VBID for the same VB, e.g., using the contents, type, and approximate coordinate. Additionally, the VBID has a compact format for efficient identification either with a remote server or the mobile platform.

FIG. 3 illustrates an example of the structure for a VBID 100, which may be generated by mobile platform 150 based on the observation of VB 10. The VBID is a universally constructible and reproducible identifier for a visual beacon. As illustrated in FIG. 3, the VBID may include the following information: 1) coarse position 102, e.g., latitude, longitude, altitude (LLA) coordinates or an identification (CellID) of a transmitter or cell, other device or area in a cellular network, associated with the visual beacon; 2) visual beacon type 104 (e.g., QR code, 1D bar code, data matrix, PDF 417, or other); and/or 3) content identifier 106, which may be a randomized identifier based on the visual beacon content, or other information based on the visual beacon content, as described below. The VBID may optionally contain a fine position 108 and all of the VB contents 110, e.g., an image of the visual beacon. The mobile platform 150 may additionally provide an amount or estimate of how uncertain the position is, along with or separately from the coarse position 102 and fine position 108. Other information may be included if desired. FIG. 3 provides an example of the length in bytes for each VBID entry, but the length may vary if desired.

If the VB either contains a built-in unique identity or the content itself is unique, position information may not be necessary for the VBID 100. However, visual beacons, such as QR codes, are deployed by various entities for various purposes which typically do not require unique identification. Thus, the position information serves as a distinguisher of individual VBs. In principle, geographical refinement reduces the likelihood of VBID ambiguity. The approximate coordinate given by the position information defines a search window within which the VB can be identified. Thus, the level of required positional accuracy for the VBID can be a few orders worse (1 to 100 km) than what can be achieved by VB based positioning, i.e., determining the pose with respect to the VB, which provides sub-meter accuracy.

Because each mobile platform has a different level of a priori knowledge of location information, the coordinate information in the VBID 100 is divided into two categories: coarse position 102 and fine position 108. The coarse position 102 may be provided based on LLA or other positioning information, such as CellID for a cellular network. The coarse position may be targeted to match a CellID level of accuracy (10 to 100 km) so that a mobile platform in contact with a cellular network can recover this coarse position. Thus, the coarse position 102 may be provided with approximately 1°-0.1° accuracy, where 1° corresponds to approximately 100 km in distance and 0.1° corresponds to approximately 10 km. Altitude remains optional and can be omitted as it may be relatively difficult for certain implementations of a mobile platform to extract altitude information. The resolution of coarse LLA may be fixed to the largest uncertainty (e.g. 1°) or set adaptively, e.g., to population density or cell deployment density (e.g. 1° for rural area and 0.1° for urban area). Population or cell deployment densities may be indicative of QR code density and thus, a smaller grid may be employed where QR codes are expected to be more densely deployed.

The coarse position 102 may be targeted to match a CellID level of accuracy (10 to 100 km) so that a mobile platform in contact with a cellular network can recover this coarse LLA when searching a database using the VBID 100. Thus, for mobile platforms with cellular modems, the CellID itself can be used instead of LLA information. One advantage of using CellID for the coarse position 102 is that its density is expected to be proportional to population density. Thus, in urban environment with densely deployed VBs, the CellID provides a narrower search window than CellIDs in rural areas. Multiple radio access technologies and carrier networks (e.g. CDMA, GSM, WCDMA, LTE . . . ) may be deployed in a given area, and thus the same VB may be observed by mobile platforms communicating over different networks. Accordingly, if desired, the database for VBIDs 100 can be managed based on radio access technologies and carrier networks, e.g., each different carrier network may have a separate database for VBIDs 100 or the coarse position 102 may have CellID entries for each carrier network. FIG. 4 illustrates VBID 100 entries CellType 102*a* and CellID 102*b*, which may be used in place of the coarse position 102 in FIG. 3. Alternatively, to consolidate multiple reports for CellID for different networks, the CellID can be converted into LLA and a single VBID record can be created in the database 125 including LLA and multiple CellIDs (e.g. CDMA CellID, GSM CellID . . . ). Thus, any of these entries (LLA, CDMA CellID, GSM CellID . . . ) can be used in the VBID 100 to search for a VB in the common database.

The optional fine position 108 refers to location information on the level of approximately 0.1°–0.01° accuracy, where 0.1° corresponds to approximately 10 km in distance and 0.01° corresponds to approximately 1 km. The use of fine position 108 may be optional in the VGID 100 as not all mobile platforms maintain this level accuracy. One particular case, in which this level of accuracy is obtained, is the transition from outdoors to indoors, where the mobile platform is performing SPS positioning. Before entering into a building, the mobile platform maintains approximately 100 m accuracy, which will degrade over time as the mobile platform navigates indoors. The error in the mobile platform location can be limited to the known building size, e.g., 200 m by 200 m, which is qualified as fine position 108. The fine position 108 further narrows the search window for the VB, and thus faster identification of VBs is feasible with minimum likelihood of VBID ambiguity. To support different positioning resolution of a mobile platform and of a VBID, position information may be generated and provided with either fixed or scalable resolution parameters (i.e. positioning uncertainty). When identification is conducted with two LLAs, both LLA values are compared in a same level of resolution. For example, if two latitude values are given, 30.0 degree with 0.1 degree resolution and 30.03 degree with 0.01 degree resolution, the second latitude may be rounded to 30.0 because the lowest resolution is 0.1 degree. In this example, the two latitude values may therefore be declared to be identical.

Referring back to FIG. 3, the VB type 104 entry in the VBID 100 is provided for basic description of the type of visual beacon. Although QR codes are illustrated in the figures herein, other VBs, such as 1D, 2D, or 3D codes, may be supported as well. Accordingly, the type is listed in VB type 104. Moreover, additional information may be provided, such as the version information of a particular VB. For example, if the VB is a QR code, the version information may be useful as it describes the encoding capability of the QR code. The VB type 104 may be omitted in some embodiments, or may optionally be included as determined by the mobile platform 150.

The VBID 100 also includes a content identifier at contentID 106. The content of the VB, in combination with its position, may uniquely identify the VB. The contentID 106 may provide an identifier that is based on a portion or sampling of the content of the VB. Alternatively or additionally, the entire content of the VB, or an image of the VB, may be included in the contentID 106 or in a separate entry, e.g., VB contents 110.

While the VB content may provide a source of uniqueness, the content itself is not predictable and can include anything such as a coupon, merchandise information, or building description. Moreover, the amount of content present and the language in different VBs may vary. The mapping between the content of a VB and the contentID 106 may be implemented in any desired manner. In one approach, a fixed number of bits (or bytes) are sampled and used as the identifier in contentID 106. The resulting contentID 106 may have a fixed length (e.g. 8 bytes) or a variable length that is proportional to the VB type (and/or version).

FIG. 5 illustrates an example of generating content information for a visual beacon by decoding the contents of the visual beacon. As illustrated in FIG. 5, the raw bits of the VB are retrieved, e.g., by reading the VB (202). The retrieved data is provided to a decoder, for example a Reed-Solomon decoder (204) as illustrated in FIG. 5. The Reed-Solomon decoder 204 produces the original content of the VB and removes potential errors in image processing when reading the VB. After the content is decoded, it is sampled to produce the content information. In one embodiment, the decoded content produced by the Reed-Solomon decoder 204 is provided to an interleaver 206, which interleaves the content to generate a randomized sequence. The interleaver 206 is used to re-order the contents, for example to avoid relying on the use of a few initial bits of information that are commonly used in VBs, such as "http:// . . . " After interleaving, a sampler 208 samples the data to generate the contentID 106, for example by selecting a plurality of consecutive bits of the interleaved contents such as the first 64 bits.

Alternatively, the contentID 106 may be generated without decoding the raw bits read from the VB. Thus, referring to FIG. 5, the raw bits from the VB are read, but instead of providing the raw bits to the Reed-Solomon decoder 204, the raw bits are provided to interleaver 206. The interleaving is advantageous to avoid localized sequential errors (image could be corrupted locally due to uneven lighting condition, for example), but is not required. The raw bits may therefore be provided directly to the sampler 208. The sampler 208 may use the first few bytes from interleaver 206 or the raw bits 202, if interleaver 206 is not used, to generate the contentID 106. Alternatively, for reliable generation of the contentID 106, the entire bit sequence for the VB may be used. Thus, for example, sampler 208 may divide the bit sequence into a number of blocks and from each block produce one or more bits, e.g., using majority voting or other appropriate process. All the bits derived from each block are then combined by the sampler 208 to become the contentID 106. Thus, error propagation from the image processing (reading raw bits from an image) can be minimized.

The use of the encoded raw bits read from the VB is a viable approach to producing contentID 106, as VBs with very similar content often have significant differences in their encoded bits. For example, FIGS. 6A and 6B illustrate two examples of QR codes with similar contents. In FIG. 6A, the QR code contains the content "hello world" while in FIG. 6B, the QR code contains the content "hello worle." Despite the similar content, inspection of the two QR codes in FIGS. 6A and 6B shows that the encoded QR bits have significant differences, which is due to the presence of Reed-Solomon encoding. Thus, the use of the encoded raw bits from the VB may be used as contentID 106 to distinguish between VBs with similar content.

The VBID 100, which uniquely identifies a VB, is stored in the VB database 125 (FIG. 1) and is associated with any desired information, such as navigation assistance information. In the database, there may be a large number of registered VBs, with their associated navigation assistance information. Thus, finding an exact match for a given VB in the VB database 125 may be a computationally intensive process. The VBID may be used as an index to the VB entries in the VB database 125 and the associated assistance information, however, to improve efficiency.

Figure 7:
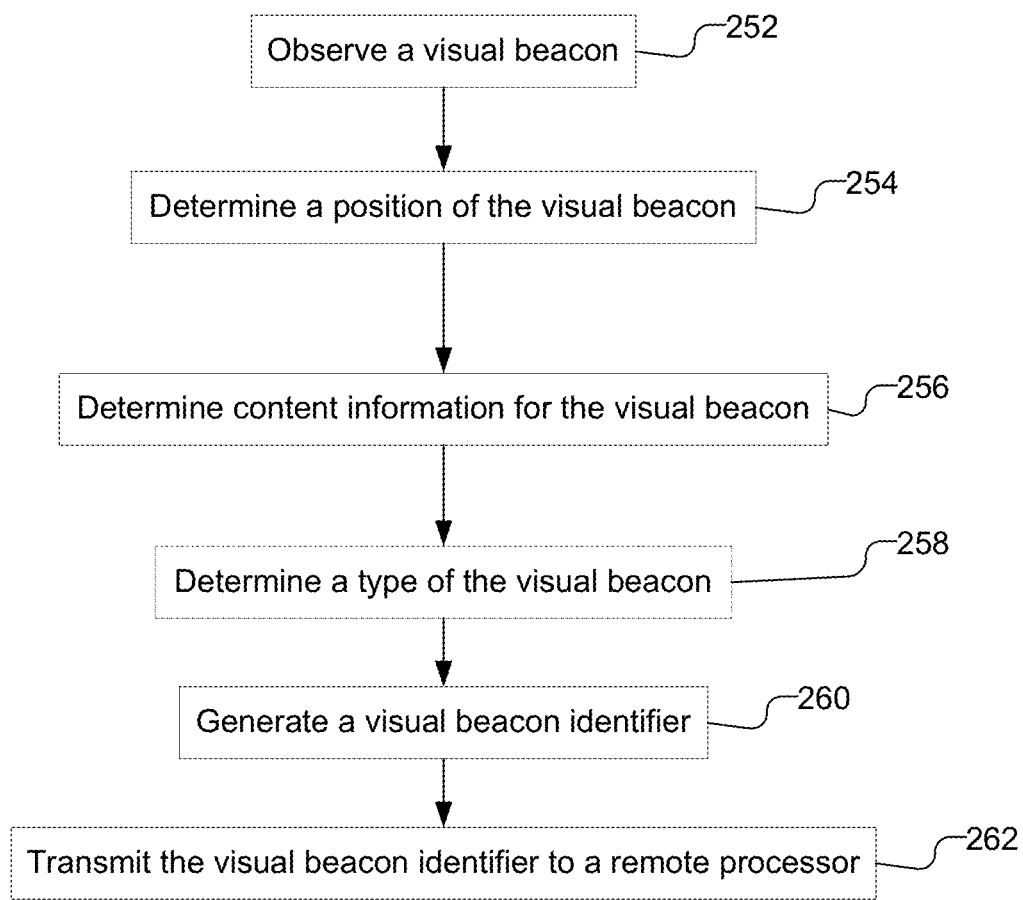
FIG. 7 is a flow chart illustrating a method performed by a mobile platform to access a navigation assistance server with the identity of a visual beacon.

FIG. 7 is a flow chart illustrating a method performed by mobile platform 150 to access a navigation assistance server 130 with the identity of a visual beacon. As illustrated, the mobile platform 150 observes the visual beacon (252), e.g., using a camera or other appropriate visual beacon reader, such as a bar code reader or an RFID reader. The mobile platform 150 determines the position of the visual beacon (254). The position of the visual beacon may be based on the last good fix from an SPS system, for example. If substantial time or movement has occurred since the last good fix, additional position information may be used to improve the estimate. Alternatively, the position of the visual beacon may be based on a CellID from a cellular network, for example, as discussed above. Content information for the visual beacon is determined (256) and optionally, the visual beacon type may be determined (258). The content information may be a sampling of the content, as discussed above, all of the content, or an image of the visual beacon. The mobile platform generates a visual beacon identifier using the position, the content information, and, optionally, the type (260) and transmits the visual beacon identifier to the navigation assistance server (262). The mobile platform 150 additionally receives a navigation assistance message from the server in response to transmitting the visual beacon identifier. The mobile platform may determine a position of the visual beacon with greater accuracy based on the navigation assistance message. One or more of the functions discussed above may be performed by a processor of the mobile platform 150.

Figure 8:
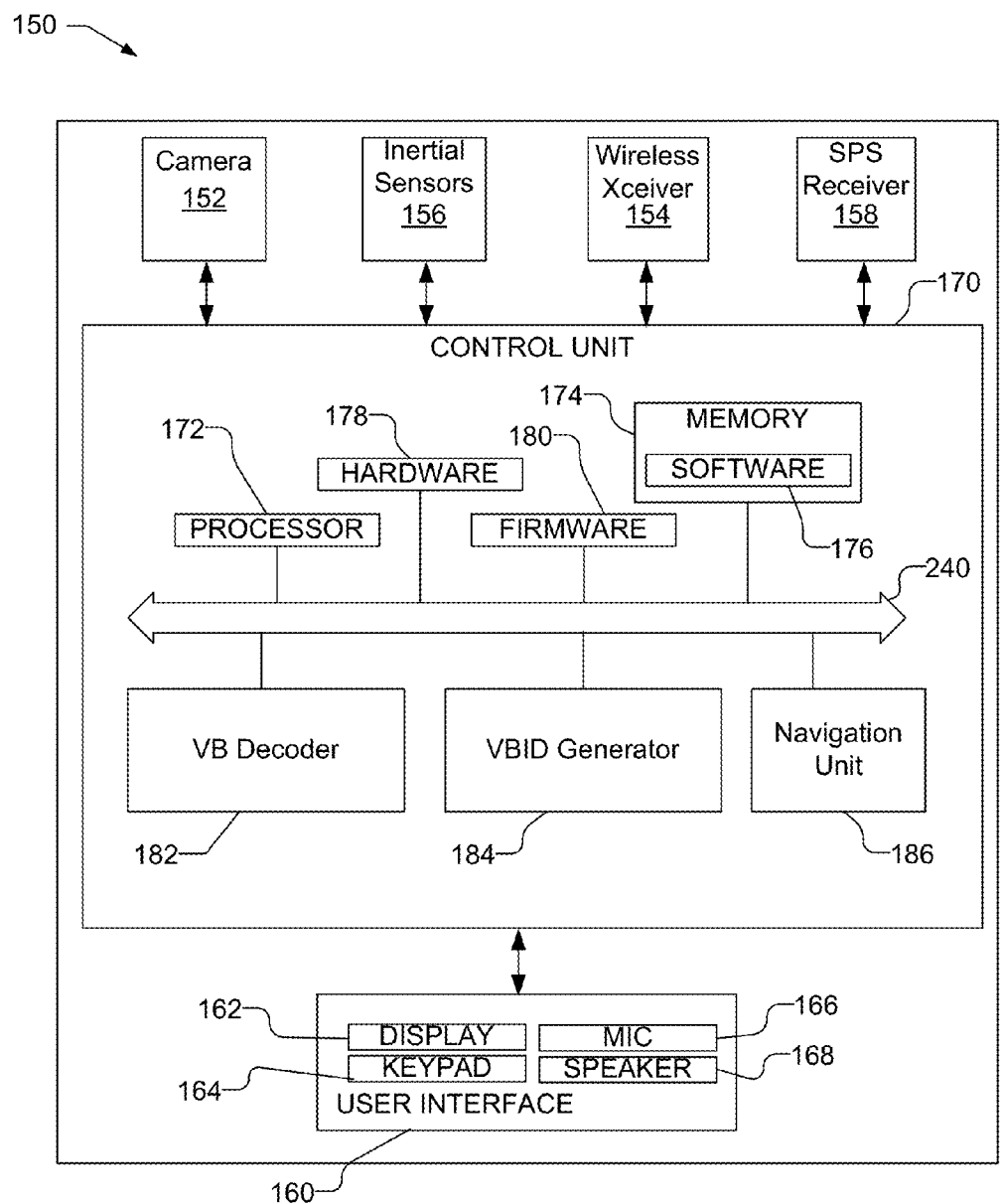
FIG. 8 illustrates a block diagram of a mobile platform capable of generating a visual beacon identifier.

FIG. 8 illustrates a block diagram of a mobile platform 150 capable of generating a VBID based on an observed visual beacon and to communicate with a navigation assistance server to acquire navigation assistance information based on the VBID. The mobile platform 150 is illustrated as including a VB sensor in the form of a camera 152 or other appropriate device to read a visual beacon. The mobile platform 150 also includes a wireless transceiver 154, which is used to access the server 130 via the wireless network 120 (FIG. 1). The wireless transceiver 154 is capable of connecting to server 130 to obtain data, such as the navigation assistance message, using the wireless network 120, e.g., through access points for WiFi or Femtocells or through cellular telephonic access points. The wireless network 120 may comprise a wireless wide area network (WWAN), a wireless local area network (WLAN), a wireless personal area network (WPAN), a cellular network, and so on. The wireless transceiver 154 (or an additional wireless transceiver) may be capable of communicating with wireless network 120 using cellular towers or via satellite vehicles. The cellular tower that wireless transceiver 154 is communicating with may be used to generate a coarse position of the mobile platform 150 when generating a VBID for an observer visual beacon, for example using a known position of the tower or CellID, as discussed above. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. Those of skill in the art will appreciate that other types of networks may be utilized, and that the wireless transceiver 154 may be configured to communicate over any number of different networks.

The mobile platform 150 may also include motion sensors 156, such as inertial sensors and rotation sensors or other similar sensors, which may be used to provide data with which the mobile platform 150 can determine its position and orientation. Examples of motion sensors that may be used with the mobile platform 150 include accelerometers, quartz sensors, gyros, or micro-electromechanical system (MEMS) sensors used as linear accelerometers. Mobile platform 150 may include additional positioning components, such as a SPS receiver 158, which receives signals from a SPS system, such as the Global Positioning System (GPS), with which mobile platform 150 can determine a coarse position of the mobile platform 150 (or a fine position in many circumstances, for example if the position fix is nearly contemporaneous) when generating a VBID for an observed visual beacon. The mobile platform 150 may include additional elements, such as a received signal strength indicator system (RSSI) that can be connected to the wireless transceiver 154 and used to determine position based on the signal strength of the wireless signals, e.g., by comparing the signal strength to a wireless positioning resource almanac that may be received in the navigation assistance message.

The mobile platform 150 may also include a user interface 160 that includes a display 162 capable of displaying text or images, e.g., of the visual beacon, captured by the camera 152, as well as navigation information if desired. The user interface 160 may also include a keypad 164 or other input device through which the user can input information into the mobile platform 150. If desired, the keypad 164 may be obviated by integrating a virtual keypad into the display 162 with a touch sensor. The user interface 160 may also include a microphone 166 and speaker 168, e.g., if the mobile platform is a cellular telephone. Of course, mobile platform 150 may include other elements unrelated to the present disclosure.

The mobile platform 150 also includes a control unit 170 that is connected to and communicates with the camera 152, wireless transceiver 154, motion sensors 156, and SPS receiver 158, as well as the user interface 160, along with any other desired features. The control unit 170 may be provided by a processor 172 and associated memory/storage 174, which may include software 176, as well as hardware 178, and firmware 180. The control unit 170 includes a VB decoder 182, which is used to decode an artificial visual beacon, and a VBID generator 184, which produces a VBID based on an observed visual beacon as discussed above. The control unit 170 may further include a navigation unit 186 that can be used for navigation based on the data from the SPS receiver 158, motion sensors 156, and/or pose determination from the VB, as well as any navigation assistance message received via the wireless transceiver 154. The VB decoder 182, VBID generator 184, and navigation unit 186 are illustrated separately and separate from processor 172 for clarity, but may be a combined and/or implemented in the processor 172 based on instructions in the software 176 which is run in the processor 172. The control unit 170 may be configured to implement one or more functions illustrated or discussed with respect to the method of FIG. 7, and/or may be configured to implement functionality of the content generation illustrated in FIG. 5.

It will be understood as used herein that the processor 172, as well as one or more of the VB decoder 182, VBID generator 184, and navigation unit 186 can, but need not necessarily include, one or more microprocessors, embedded processors, controllers, application specific integrated circuits (ASICs), digital signal processors (DSPs), and the like. The term processor is intended to describe the functions implemented by the system rather than limiting these elements to specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 178, firmware 180, software 176, or any combination thereof. For a hardware implementation, VB decoder 182, VBID generator 184, and navigation unit 186 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Thus, the device to read a visual beacon may comprise a camera as discussed above, or other means for observing a visual beacon. The device to determine a position of the visual beacon may comprise motion sensors 156, SPS receiver 158, or other means for determining a position of the visual beacon. The device to determine content information for the visual beacon may comprise the camera 152, the VB decoder 182, which may be implemented in hardware, firmware or software, or other means for determining the content information for a visual beacon. The device for generating a visual beacon identifier using the position and the content information may comprise the VBID generator 184, which may be implemented in hardware, firmware or software, or other means for transmitting the visual beacon identifier to a remote processor. A device for transmitting the visual beacon identifier to a remote processor may comprise the wireless transceiver 154, or other means for transmitting the visual beacon identifier to the remote processor. A device for determining the type of the visual beacon may comprise the VB decoder 182, which may be implemented in hardware, firmware or software, or other means for determining a type of the visual beacon. A device for receiving a navigation assistance message from the remote processor may comprise the wireless transceiver 154, or other means for receiving a navigation assistance message from the remote processor in response to transmitting the visual beacon. A device for determining a location of the visual beacon based on the navigation assistance message may comprise the navigation unit 186, which may be implemented in hardware, firmware or software, or other means for determining a location of the visual beacon based at least in part on the navigation assistance message, wherein the determined location may be more accurate than the determined position.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 174 and executed by the processor 172. Memory may be implemented within or external to the processor 172.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
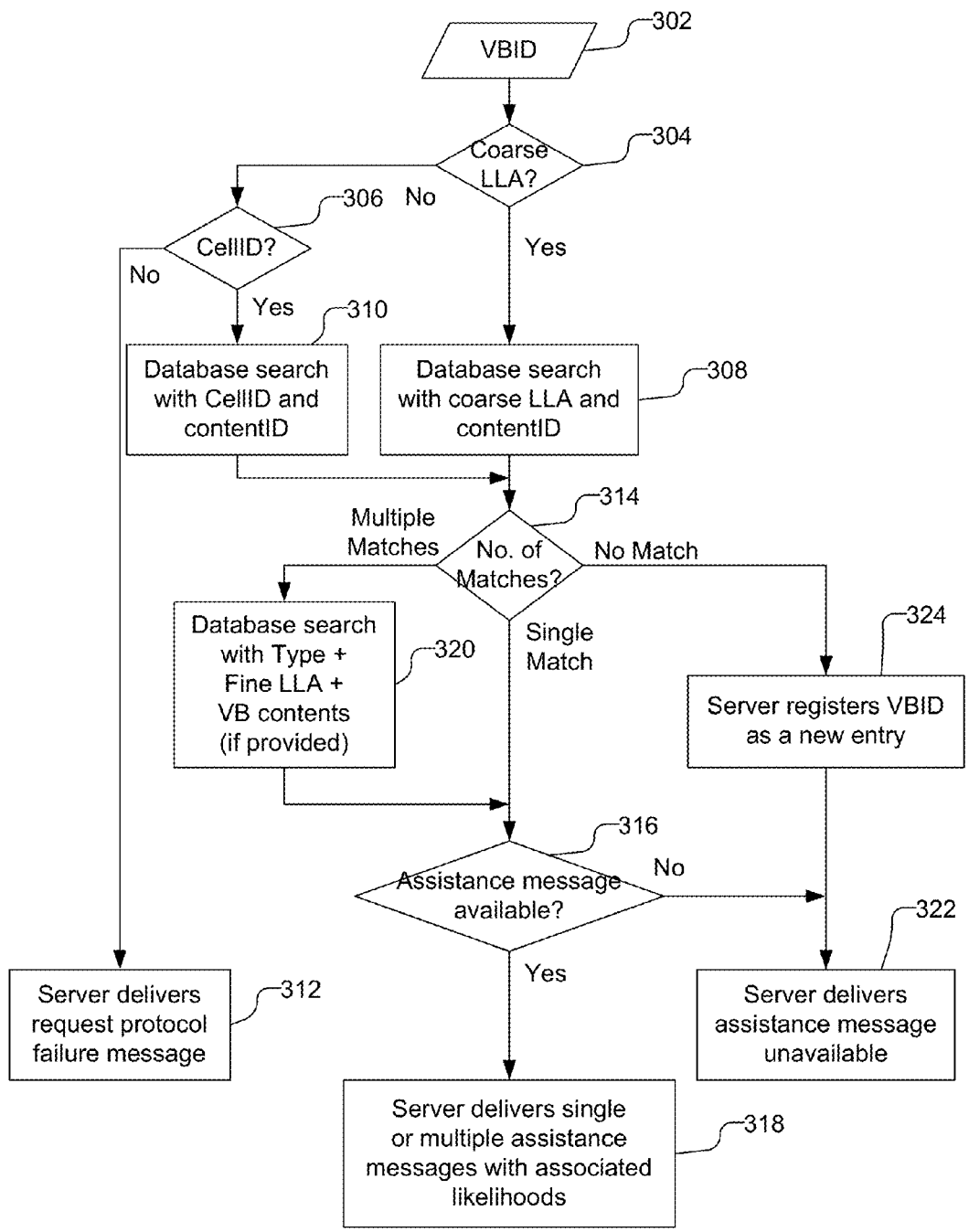
FIG. 9 is a flow chart of the lookup procedure employed by the navigation assistance server using the visual beacon identifier.

FIG. 9 is a flow chart of the lookup procedure employed by the navigation assistance server 130 (FIG. 1) using the VBID 100. For a given VBID (302), e.g., received from a mobile platform 150, the coarse position 102 of the VBID is checked. For example, as illustrated in FIG. 9, the VBID is checked to see if the format of the coarse position 102 is provided in coarse LLA (304) or CellID (306). A search of the database, which is pre-sorted according to VBID in some embodiments, is performed using either coarse LLA and contentID (308) or CellID and contentID (310), as appropriate. For example, the database entries may be stored in groups under each LLA grid or CellID. Storing the entries in this way may increase the speed and efficiency of searching of the database. If the VBID format has neither coarse LLA nor CellID, the server delivers a request protocol failure message 312.

Within an identified entry group, matches for the given contentID are checked. As parsing errors in the reported contentID are possible or similar VBs may exist within an identified locale, there may be more than one match. If there is a single match (314) and an assistance message is associated with the entry (316), then the server delivers the available assistance message (318). If there are multiple matches (314), a further search may be attempted using additional information from the VBID, such as the VB type, fine LLA, and or VB contents, if provided (320). For example, a hard decision may be employed after each step of comparison or, alternatively, all information can be compared in parallel and the overall matching probability can be calculated based on weighted combination of individual comparison results for a soft decision. If one or more assistance messages are available 316, the server provides the one or more assistance messages corresponding to the multiple matches, along with estimated matching probability (e.g. assistance A with 70% probability and assistance B with 30% probability) (318). The mobile platform 150 may apply the multiple assistance messages in the order of their probability and stop when successful positioning results are generated.

If no matches are generated (314), the server delivers a message indicating that an assistance message is unavailable (322). Additionally, the unmatched VBID may be registered as a new entry to the database (324). For example, the VBID may be entered in the database as a newly discovered VB. Upon verification of the VB, e.g., by a number of additional mobile platforms that similarly identify the VBID at the same position, the VBID is registered in the database as a legitimate entry to the database.

Figure 10:
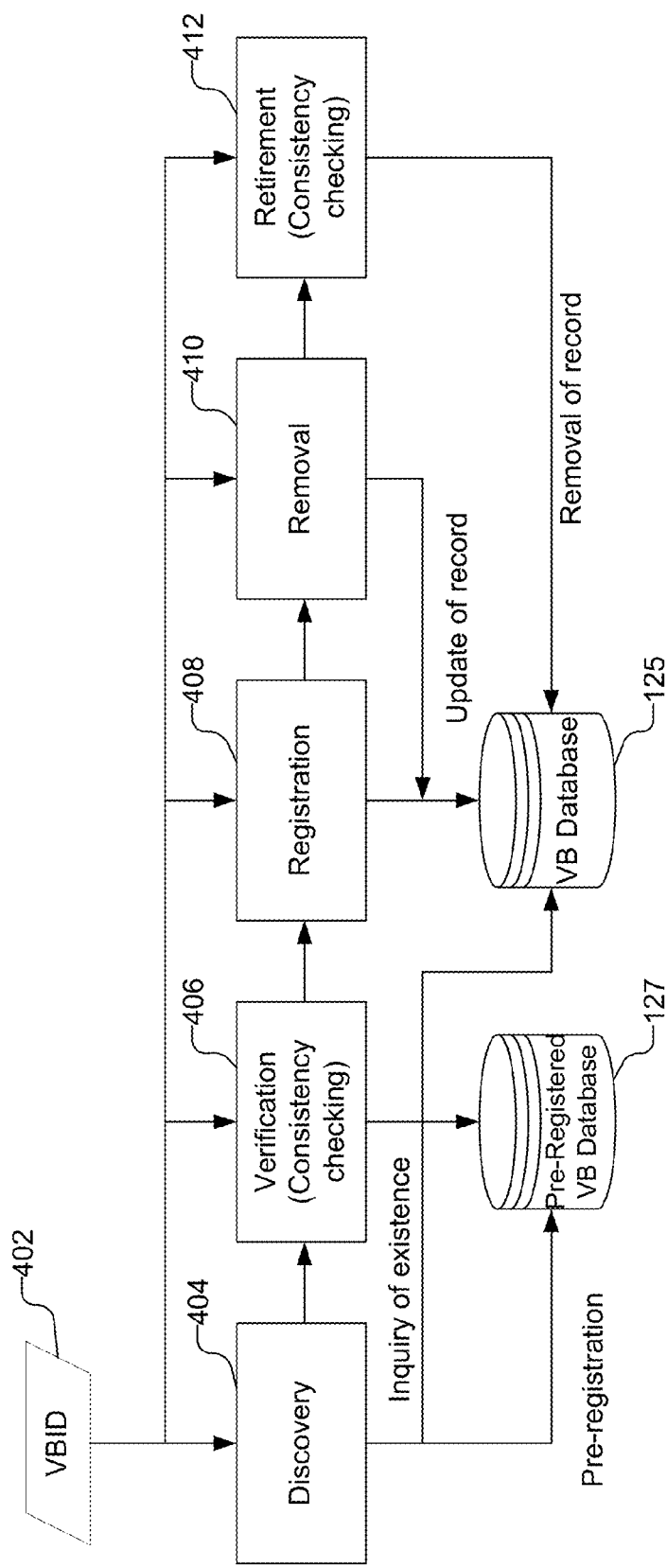
FIG. 10 illustrates the overall life cycle of a visual beacon identifier.

FIG. 10 illustrates the overall life cycle of a VBID. The lifecycle for a newly observed VBID 402 includes discovery 404, verification 406, registration 408, refinement 410, and removal 412. Discovery of the VBID 402 occurs when a mobile platform 150 (FIG. 1) transmits the VBID to the navigation assistance server 130, which searches the VB database 125, as well as a pre-registered VB database 127, if used. The pre-registered VB database 127 may be a separate database from VB database 125 or may be simply a flag that is set in the VB database 125. The pre-registered VB database 127 is used to store, e.g., recently discovered VBIDs that have not been verified and registered in the VB database 125. If the VBID is in neither the VB database 125 nor the pre-registered VB database 127, the VBID is considered discovered 404 and entered into the pre-registered VB database 127. Thus, records of VBIDs may be entered into the database 125 or 127 based on observation. Further, records may be imported from information provided by vendors that place or install VBs, or may be pre-loaded into the database.

During verification 406, the same VBID 402 must be transmitted from a number of mobile platforms. Each time the VBID 402 is submitted to the navigation assistance server 130, the content of the VBID 402 should be consistent. The number of times that a VBID 402 should be submitted to the navigation assistance server 130 for verification should be sufficient to prevent unreliable or temporary VBs from being entered into the VB database 125. In some embodiments, the number of times is dynamic—for example, the number of times may be determined by the navigation assistance server 130 or the VB database 125 based on a density of CellIDs— while in other embodiments, the number of times may be static or otherwise determined a priori. The VBID may be labeled or classified as static, e.g., where the position does not change over multiple observations, or dynamic, e.g., where the position changes over multiple observations. Once the VBID 402 is verified with repeated and consistent submissions, registration 408 of the VBID 402 occurs by entering the VBID 402 into the VB database 125. Refinement 410 occurs as later observations of the registered VB are accumulated and the VB database 125 is updated accordingly. For example, the accuracy of the coarse position and/or fine position of the VBID 402 may be improved when the reported positions are combined with proper weighting according to reported uncertainty. During refinement 410, it may be possible to split a VBID into multiple VBIDs as the observation resolution improves if there are multiple, similar or identical VBs near the same location. The refined estimation of VB location may reveal existence of undistinguished neighboring VBs. If an entry in the VB database 125 is not observed for a period of time, removal 412 of the VBID may occur by removing the entry from the VB database 125.

Figure 11:
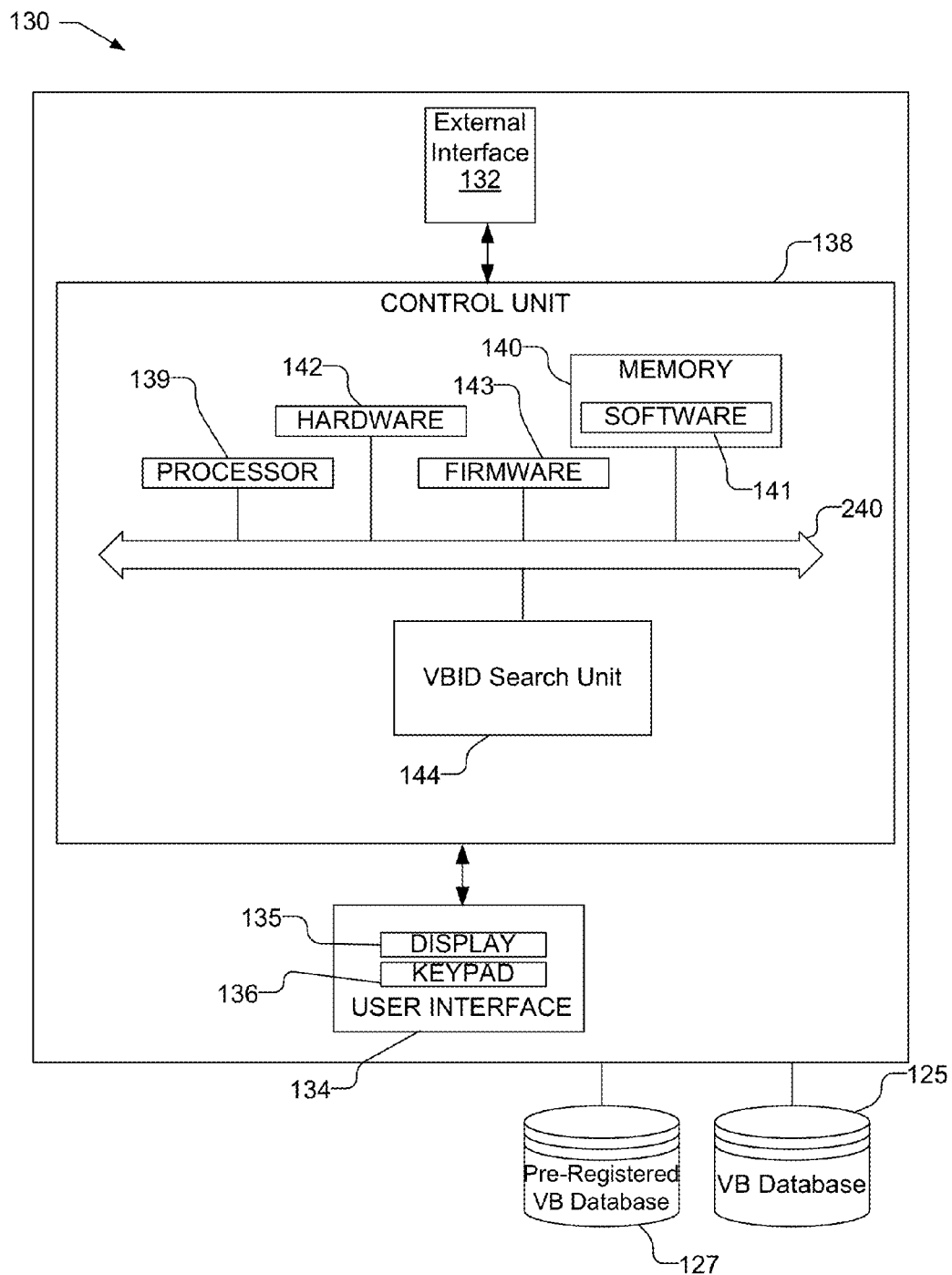
FIG. 11 illustrates a block diagram of a navigation assistance server capable of receiving a visual beacon identifier and searching a database.

FIG. 11 illustrates a block diagram of a navigation assistance server 130 capable of receiving a VBID from, e.g., mobile platform 150, and searching a VB database 125 and returning an associated navigation assistance message based on the VBID, as discussed above. While FIG. 10 illustrates a single server 130, it should be understood that multiple servers communicating over wireless network 120 may be used. The server 130 includes an external interface 132, which is used to communicate with the mobile platform 150 via the wireless network 120 (FIG. 1). The external interface 132 may be a wired communication interface, e.g., for sending and receiving signals via Ethernet or any other wired format. Alternatively, if desired, the external interface 132 may be a wireless interface. The server 130 may further include a user interface 134 that includes, e.g., a display 135 and a keypad 136 or other input device. As illustrated, the server 130 is coupled to the VB database 125 as well as the pre-registered VB database 127. In some embodiments, the user interface 134 is omitted.

The server 130 includes a server control unit 138 that is connected to and communicates with the external interface 132 and the user interface 134. The server control unit 138 accepts and processes data from the external interface 132 and the user interface 134 and controls the operation of those devices. The server control unit 138 may be provided by a processor 139 and associated memory/storage 1140, which may include software 141, as well as hardware 142, and firmware 143. The server control unit 138 includes a VBID search unit 144 that accesses the VB database 125 based on a received VBID to acquire any associated navigation assistance information, which is then provided to the mobile platform 150 via the external interface 132. As discussed in FIG. 9, if the VBID is not found in the VB database 125, the VBID search unit 144 may cause the VBID to be entered into the pre-registered VB database 127, followed by verification and registration in the VB database 125, as well as refinement and removal, as discussed above. The VBID search unit 144 is illustrated as separate from processor 139 for clarity, but may be implemented in the processor 139 based on instructions in the software 141 which is run in the processor 139. It will be understood as used herein that the processor 139, as well as the VBID search unit 144 can, but need not necessarily include, one or more microprocessors, embedded processors, controllers, application specific integrated circuits (ASICs), digital signal processors (DSPs), and the like. The term processor is intended to describe the functions implemented by the system rather than limiting these elements to specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored. The server control unit 138 may be configured to implement one or more functions illustrated or discussed with respect to the procedure of FIG. 9, and/or may be configured to implement functionality of the overall life cycle of a VBID illustrated in FIG. 10.

The methodologies described herein may be implemented by various means depending upon the application. For example, these methodologies may be implemented in hardware 142, firmware 143, software 141, or any combination thereof. For a hardware implementation, the VBID search unit 144 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The device for receiving information for a visual beacon may comprise the external interface 132 or other means for receiving position information for a visual beacon and at least one of a type and a content information for the visual beacon. The device for searching the database may comprise the VBID search unit 144, which may be implemented in hardware, firmware or software, or other means for searching a database using the position information for the visual beacon to identify one or more matches. The device for searching one or more identified matches may comprise the VBID search unit 144, which may be implemented in hardware, firmware or software, or other means for searching the one or more identified matches using at least one of the type and the content information for the visual beacon to determine whether a matching visual beacon record is stored in the database. The device for providing assistance information may comprise the external interface 132 or other means for providing assistance information associated with the visual beacon when the matching visual beacon record is stored in the database. The device for entering a visual beacon record in the database may comprise the VBID search unit 144, which may be implemented in hardware, firmware or software, or other means for entering a visual beacon record in the database for the visual beacon when no matching visual beacon record is stored in the database. The means for verifying the visual beacon before registering the visual beacon record in the database, means for refining the visual beacon record, and/or means for removing the visual beacon record from the database may comprise the VBID search unit 144, which may be implemented in hardware, firmware or software. Where additional information for the visual beacon is received, a device for selecting one of the plurality of matching visual beacon records based on additional information may comprise the VBID search unit 144, which may be implemented in hardware, firmware or software, or other means for selecting one of the plurality of matching visual beacon records based on additional information received for the visual beacon.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 1141 and executed by the processor 139. Memory may be implemented within or external to the processor 139.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    observing a visual beacon with a mobile device;
    determining a geographical first position of the mobile device;
    determining a content information for the visual beacon, wherein the content information does not contain a unique identifier of the visual beacon;
    generating a visual beacon identifier using the geographical first position and the content information;
    transmitting the visual beacon identifier to a remote processor;
    receiving a navigation assistance message from the remote processor in response to transmitting the visual beacon identifier; and
    determining a second position of the mobile device based at least in part on the navigation assistance message, the second position of the mobile device being more accurate than the geographical first position of the mobile device.

2. The method of claim 1, further comprising determining a type of the visual beacon, wherein generating the visual beacon identifier further uses the type of the visual beacon.

3. The method of claim 2, wherein the type for the visual beacon is selected from a group consisting of QR code, 1D bar code, data matrix, and PDF 417.

4. The method of claim 1, wherein determining the geographical first position of the mobile device comprises determining a coarse latitude and longitude.

5. The method of claim 4, wherein determining the geographical first position of the mobile device further comprises determining a fine latitude and longitude.

6. The method of claim 4, wherein determining the geographical first position of the mobile device further comprises determining an altitude.

7. The method of claim 1, wherein determining the geographical first position of the mobile device comprises determining a CellID from a cellular network.

8. The method of claim 1, wherein determining the content information for the visual beacon comprises sampling a content of the visual beacon.

9. The method of claim 8, wherein determining the content information for the visual beacon further comprises interleaving the content of the visual beacon prior to the sampling.

10. The method of claim 8, wherein the sampling comprises dividing the content into blocks, and selecting a bit from a plurality of the blocks using a majority voting process.

11. The method of claim 1, wherein the visual beacon comprises encoded content, and wherein determining the content information comprises selecting at least a portion of the encoded content.

12. The method of claim 1, wherein the visual beacon comprises encoded content, wherein determining the content information comprises decoding the encoded content, and wherein the visual beacon identifier is generated using the decoded content.

13. The method of claim 1, wherein the content information for the visual beacon is an image of the visual beacon.

14. An apparatus comprising:
    a visual beacon sensor adapted to observe a visual beacon;
    a position sensor;
    a processor coupled to the visual beacon sensor and the position sensor, the processor being adapted to determine a geographical first position of the apparatus using data received from the position sensor, to determine a content information for the visual beacon using the data from the visual beacon sensor, wherein the content information does not contain a unique identifier of the visual beacon, and to generate a visual beacon identifier using the geographical first position and the content information; and a wireless transmitter coupled to the processor and adapted to transmit the visual beacon identifier to a remote processor; and a receiver adapted to receive a navigation assistance message from the remote processor, wherein the processor is further adapted to determine a second position of the apparatus based at least in part on the navigation assistance message, second position of the apparatus being more accurate than the geographical first position of the apparatus.

15. The apparatus of claim 14, wherein the processor is further adapted to determine a type of the visual beacon and generate the visual beacon identifier using the type.

16. The apparatus of claim 14, wherein the visual beacon sensor is a camera.

17. The apparatus of claim 14, wherein the position sensor is one of a satellite positioning system receiver and a motion sensor.

18. An apparatus comprising:
means for observing a visual beacon with a mobile device;
means for determining a geographical first position of the mobile device;
means for determining a content information for the visual beacon, wherein the content information does not contain a unique identifier of the visual beacon;
means for generating a visual beacon identifier using the geographical first position and the content information;
means for transmitting the visual beacon identifier to a remote processor;
means for receiving a navigation assistance message from the remote processor in response to transmitting the visual beacon identifier; and
means for determining a second position of the mobile device based at least in part on the navigation assistance message, the second position of the mobile device being more accurate than the geographical first position of the mobile device.

19. The apparatus of claim 18, further comprising means for determining a type of the visual beacon, wherein the means for generating the visual beacon identifier further uses the type of the visual beacon.

20. A non-transitory computer-readable medium including program code stored thereon, comprising:
program code to determine a geographical first position of a mobile device;
program code to determine a content information for a visual beacon observed with the mobile device, wherein the content information does not contain a unique identifier of the visual beacon;
program code to generate a visual beacon identifier using the geographical first position and the content information, and
program code to transmit the visual beacon identifier;
program code to receive a navigation assistance message in response to transmitting the visual beacon identifier; and
program code to determine a second position of the mobile device based at least in part on the navigation assistance message, the second position of the mobile device being more accurate than the geographical first position of the mobile device.

21. The non-transitory computer-readable medium of claim 20, further comprising program code to determine a type of the visual beacon, wherein the program code to generate the visual beacon identifier further uses the type of the visual beacon.

22. The method of claim 1, wherein generating the visual beacon identifier using the geographical first position and the content information comprises using only a portion of the content information.

* * * * *